United States Patent
Campara et al.

(10) Patent No.: US 6,233,729 B1
(45) Date of Patent: May 15, 2001

(54) METHOD AND APPARATUS FOR IDENTIFYING DYNAMIC STRUCTURE AND INDIRECT MESSAGING RELATIONSHIPS BETWEEN PROCESSES

(75) Inventors: Djenana Campara; Norman Rajala, both of Nepean (CA); Nikolai Mansurov, Moscow (RU)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/181,824

(22) Filed: Oct. 29, 1998

(51) Int. Cl.⁷ ........................................................ G06F 9/45
(52) U.S. Cl. .................................. 717/4; 717/8; 709/313
(58) Field of Search ..................... 71/1, 4, 3; 709/312, 709/313, 314, 315, 708, 709

(56) References Cited

U.S. PATENT DOCUMENTS

| | | | |
|---|---|---|---|
| 4,455,619 | 6/1984 | Masui et al. | 364/900 |
| 4,885,717 | 12/1989 | Beck et al. | 364/900 |
| 5,187,788 | 2/1993 | Marmelstein | 395/700 |
| 5,191,646 | 3/1993 | Naito et al. | 395/161 |
| 5,442,738 | 8/1995 | Chapman et al. | 395/135 |
| 5,513,305 | 4/1996 | Maghbouleh | 395/145 |
| 5,592,600 | 1/1997 | De Pauw et al. | 395/140 |
| 5,713,045 | * 1/1998 | Berdahl | 710/73 |
| 5,862,382 | * 1/1999 | Kataoka | 395/708 |
| 6,061,513 | * 5/2000 | Scandura | 395/701 |
| 6,131,109 | * 10/2000 | Ueki et al. | 709/107 |

FOREIGN PATENT DOCUMENTS 2144483   10/1995  (CA).

OTHER PUBLICATIONS

Dillon, "A visual execution model for Ada tasking", ACM, 1993, pp 311–345.*
Chow et al., "Minimizing register usage penalty at procedure calls", Proc. of the SIGPLAN '88 Conf. on Prog. Lang. design and implementation, 1988, pp 85–94.*
Harrold et al., "Interprocedural Data flow testing", ACM, 1989, pp 158–167.*
Jerding et al., "Visualizing Interactions in program execution", ICSE 97, ACM, 1997, pp 360–370.*
Benkner et al., "High–level management of communication schedules in HPF–like languages", ICS 98, ACM, 1998, pp 109–116.*

* cited by examiner

Primary Examiner—Kakali Chaki

(57) ABSTRACT

A system and method for identifying indirect messaging relationships between software process. Within a source code repository, all occurrences of calls to interface procedures are identified together with communications objects to which these calls pertain. Each interface procedure call is categorized as either a "send" or a "receive" interface procedure call. A relationship is identified when a pair of interface procedure calls are located which pertain to the same communications object and one of the pair has a "send" type and the other of the pair has a "receive" type. By identifying pairs of this type, relationships between hierarchical software entities which contain the interface procedure calls are also simultaneously identified. Each relationship thus identified is mapped onto one or more inter-process indirect messaging relationships.

29 Claims, 15 Drawing Sheets

|        | Name         | Count | Type   |
|--------|--------------|-------|--------|
|        | as_asent     | 1 s   | signal |
|        | as_catch     | 0 r   | signal |
|        | as_send      | 1 r   | signal |
|        |              |       |        |
|        | ev_asend     | 1 s   | event  |
|        | ev_receive   | 0 r   | event  |
|        | ev_send      | 1 s   | event  |
|        |              |       |        |
|        | q_asend      | 1 s   | queue  |
|        | q_aurgent    | 1 s   | queue  |
|        | q_avsend     | 1 s   | queue  |
|        | q_avurgent   | 1 s   | queue  |
|        | q_broadcast  | 1 s   | queue  |
|        | q_create     | 4 o   | queue  |
|        | q_delete     | 1 o   | queue  |
| 60     | q_receive    | 1 r   | queue  |
|        | q_send       | 1 s   | queue  |
|        | q_urgent     | 1 s   | queue  |
|        | q_vbroadcast | 1 s   | queue  |
|        | q_vcreate    | 5 o   | queue  |
|        | q_vdelete    | 1 o   | queue  |
|        | q_vreceive   | 1 r   | queue  |
|        | q_vsend      | 1 s   | queue  |
|        | q_vurgent    | 1 s   | queue  |
|        |              |       |        |
|        | sm_av        | 1 r   | sema   |
|        | sm_create    | 4 r   | sema   |
|        | sm_delete    | 1 o   | sema   |
|        | sm_p         | 1 s   | sema   |
|        | sm_v         | 1 r   | sema   |
|        |              |       |        |
| 62     | IpcRegMsg    | 0 r   | ipc    |
|        | IpcTxDataMsg | 2 s   | ipc    |

FIG. 9

METHOD AND APPARATUS FOR IDENTIFYING DYNAMIC STRUCTURE AND INDIRECT MESSAGING RELATIONSHIPS BETWEEN PROCESSES

FIELD OF THE INVENTION

The invention relates to systems and methods for reverse engineering software, and more particularly relates to a method and apparatus for identifying dynamic structure and indirect messaging relationships between processes.

BACKGROUND OF THE INVENTION

There are many tools available today which are capable of producing various types of graphical representations of source code. These include for example call charts which graphically illustrate which software procedures call which other software procedures, and dataflow diagrams which show the direct flow of data between software procedures.

Existing tools are generally only capable of capturing relationships between software entities which are very direct such as the above-identified call charts. More generally, existing tools are only capable of capturing the static structure of software. However, in examining software in a static manner, existing tools are not capable of identifying relationships such as containments or indirect messaging relationships between processes.

Processes are very interesting because they determine instantiation of data in software. When a certain data definition is shared between several processes, then at run-time there will exist several independent instances of that data. Each process will potentially have a different instance of the data. How data is shared between processes is dependent on the target operating system.

When looking at any data transfers within software entities, process structure needs to be taken into consideration because the data is potentially instantiated in several processes.

Processes are also important because the actions of different processes can be performed in parallel and on the other hand, all actions of one instance of a process are always performed sequentially. Actions of different processes need to be synchronized, i.e. the software should guarantee that certain interleavings of actions never happen. Processes use the operating system to exchange information and in particular to synchronize themselves.

Thus in a multiprocess system it would be desirable to observe the dynamic structure of the software, i.e. to obtain a view of the software showing relationships at run-time. Existing tools do not have this ability.

A system and method for identifying indirect messaging relationships between static software entities has been described in applicant's copending U.S. application Ser. No. 09/090,954 filed Jun. 5, 1998 hereby incorporated by reference. The system described therein is useful for generating a static view of a system but is incapable of identifying dynamic structure.

SUMMARY OF THE INVENTION

It is an object of the invention to obviate or mitigate one or more of the above identified disadvantages.

The invention provides systems and methods for extracting process structure and relationships between software processes in a manner which hides uninteresting application software and operating system calls.

According to a first broad aspect, the invention provides a method of identifying inter-process indirect messaging relationships in source code in which processes are identified by respective process references from an input consisting of an identification of a plurality of indirect messaging relationships which exist within the source code each consisting of a first procedure using a "send" type procedure and a second procedure using a "receive" type procedure, and a communications object identifier, the method comprising the steps of: for each process reference appearing in the source code, identifying an associated set of procedures which may be used by a process having that process reference; for each indirect messaging relationship: a) identifying a first set of process references consisting of all process references which include the first procedure of the indirect messaging relationship in the respective process reference's associated set of procedures; b) identifying a second set of process references consisting of all process references which include the second procedure of the indirect messaging relationship in the respective process reference's associated set of procedures; and c) extracting all possible pairs of process references including a first process reference from the first set of process references and a second process reference from the second set of process references; wherein each pair of process references extracted identifies a potential inter-process indirect messaging relationship.

According to a second broad aspect, the invention provides a system comprising: source code storage for storing a collection of source code; static structure identification means for identifying a static structured within the collection of source code; indirect messaging relationships identification means for identifying indirect messaging relationships within the collection of source code, each indirect messaging relationship comprising a first procedure performing a "send" type procedure with respect to a respective particular communications object, a second procedure performing a "receive" type procedure with respect to the same particular communications object; process identification means for identifying processes which would come into existence when the collection of source code is run, and for identifying all procedures which might be called in each process; means for identifying inter-process indirect messaging relationships by identifying for each indirect messaging relationship all processes using the first procedure and all processes using the second procedure and forming all possible combinations of one of the processes using the first procedure with one of the processes using the second procedure.

BRIEF DESCRIPTION OF THE DRAWINGS

Preferred embodiments of the invention will now be described with reference to the attached drawings in which:

FIG. 9 is an interface definition file used by the RDT of FIG. 3 in conjunction with source code written in the "C" language in a pSOS operating system environment;

DETAILED DESCRIPTION OF THE PREFERRED EMBODIMENTS

Figures 1A, 1B:
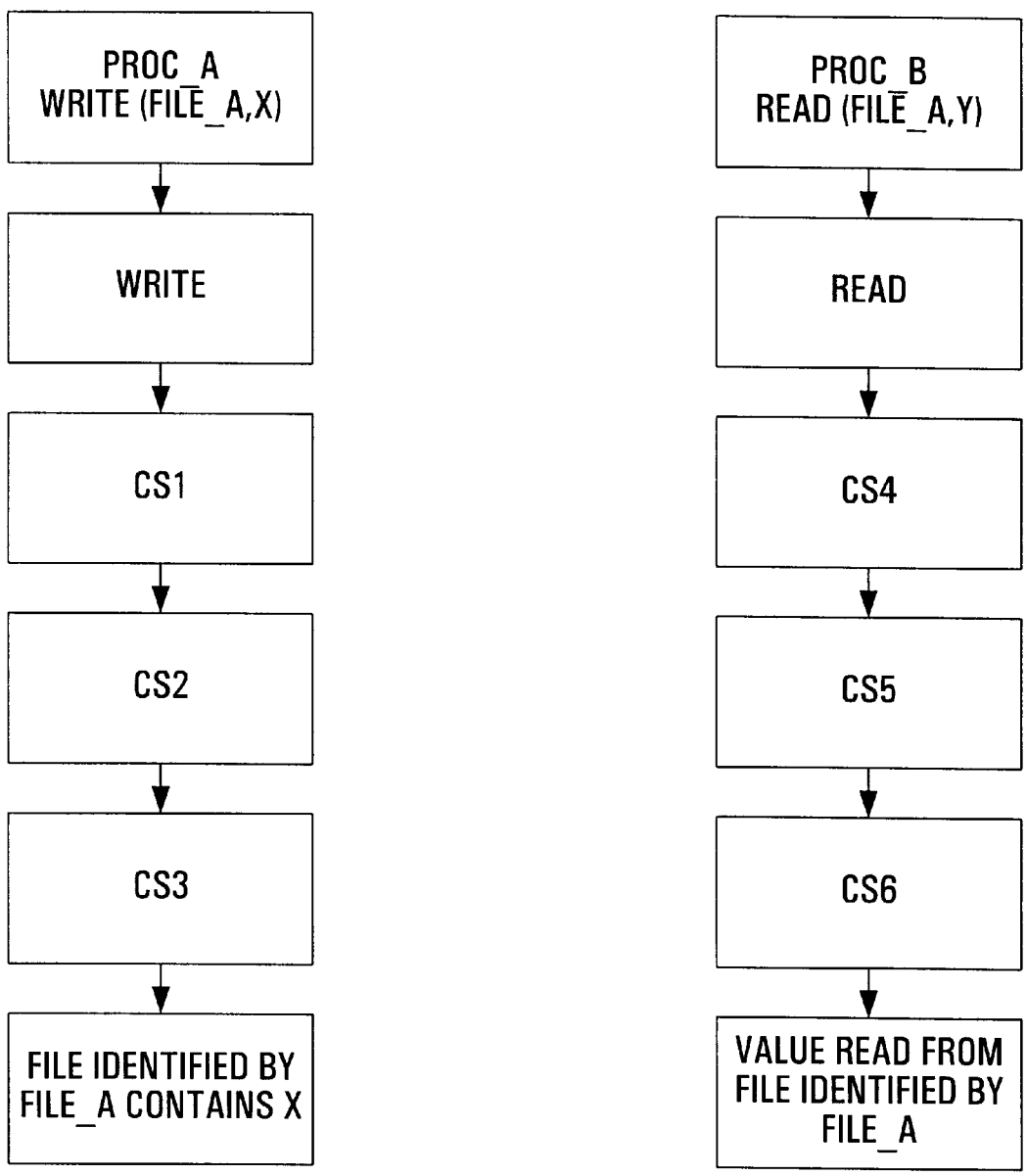
FIGS. 1A and 1B are conventional call charts for a file write and a file read.

Referring firstly to FIGS. 1A and 1B, two call charts for a messaging relationship which conventional tools are incapable of detecting or capturing are shown. In FIG. 1A, a procedure proc A contains source code calling a procedure which writes a value in a local variable X to a file identified by a global variable file_A. This source code might consist of the following statement:

Write(file_A,X).

In the process of writing X to the file identified by file_A, the procedure "Write" calls a series of operating system procedures CS1,CS2,CS3 at the end of which the file identified by file_A ends up containing the value in local variable X. In FIG. 1B, a procedure proc_B contains source code calling a procedure which reads a value from a file identified by the global variable file_A and puts this value into a local variable Y. This source code might consist of the following statement:

Read(File_A,Y).

Figure 1C:
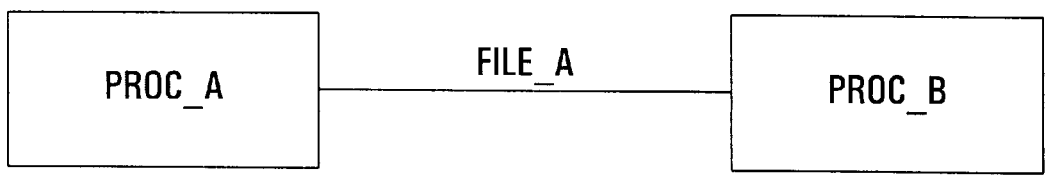
FIG. 1C is an indirect messaging relationship diagram abstracting and combining the call charts of FIGS. 1A and 1B.

In the process of reading Y from the file identified by file_A, the procedure "Read" calls a series of operating system procedures CS4,CS5,CS6 at the end of which local variable Y contains a value read from the file identified by file_A. There is an indirect messaging relationship between proc_A and proc_B since proc_A writes to the file identified by file_A, and proc_B reads from the same file. However, it is not commonplace for the source code of the OS procedures (CS1,CS2,CS3,CS4,CS5,CS6 in this example) to be available and as such it is not normally possible to generate call charts such as those of FIGS. 1A and 1B. Even if it were possible, the call chart of the write operation never meets the call chart of the read operation. This and the complexity of the call charts obscures the fact that proc_A is really communicating with proc_B. In FIG. 1C, it has been made explicitly clear that proc_A communicates with proc_B through file_A in a manner which hides all of the uninteresting OS procedure calls, and by hiding the indirectness of the relationships.

Figure 1D:
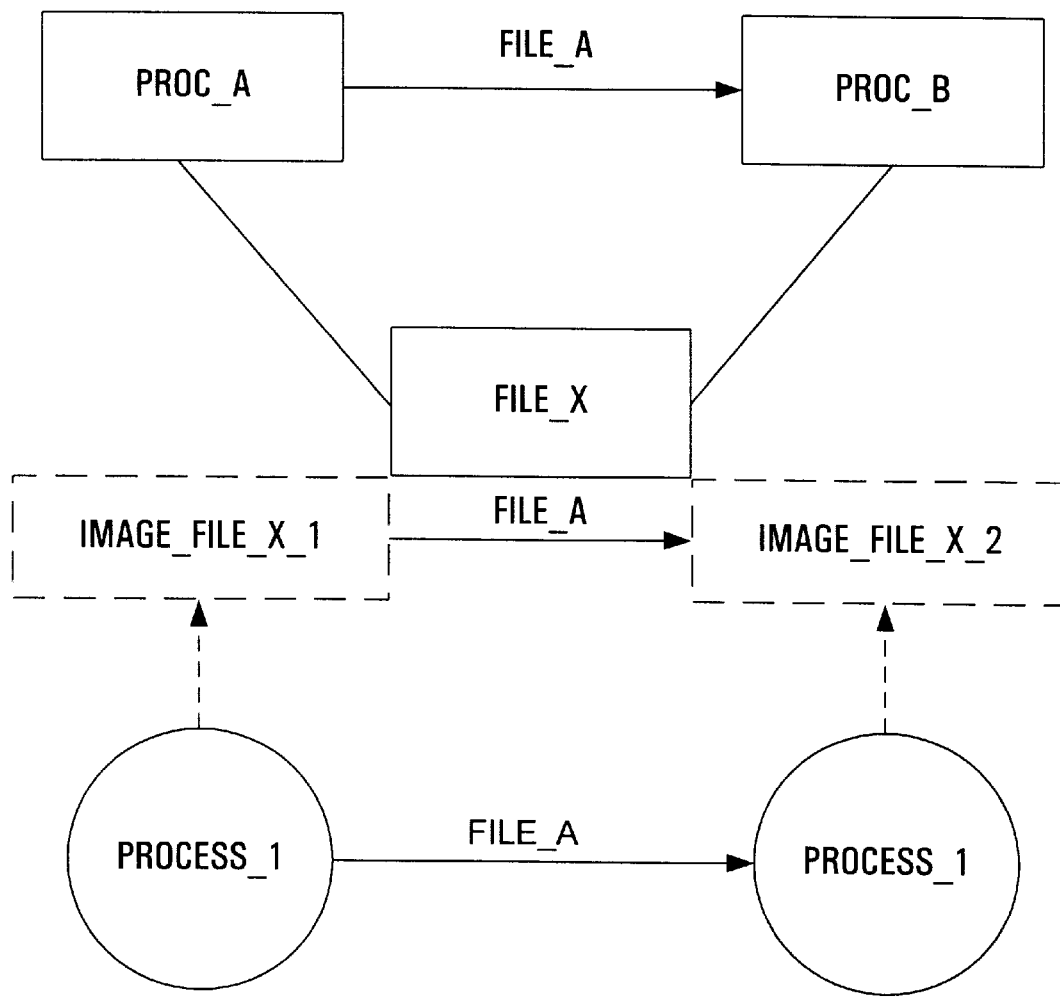
FIG. 1D is an inter-process indirect messaging relationship.

Referring next to FIG. 1D, another relationship which conventional tools are incapable of detecting or capturing is shown. In this example, file_X is a static code entity. File_X contains the above referenced proc_A, and also contains the above referenced proc_B.

During run time there are two processes, process_1 and process_2 each of which independently make use of File_X and its contained software structures. These independent utilizations will be referred to as "instances". Process_1 makes use of proc_A and process_2 makes use of proc_B. There are two instances of file_X with associated instance information data image_file_x_1 and image_file_x_2. The instance image_file_x_1 is associated with process_1, and the instance image_file_x_2 is associated with process_2.

As described above, proc_A associated with instance image_file_x_1 interacts with proc_B associated with instance image_file_x_2 through an indirect messaging mechanism involving file_A.

In the static world, this interaction is simply viewed as an interaction between proc_A and proc_B as shown in FIG. 1C. By abstacting up another layer, this interaction may be viewed as an interaction between file_X and itself.

In the dynamic world, this interaction may be viewed as an interaction between image_file_x_1 and image_file_x_2. By abstracting up a layer, this may be viewed as a dynamic interaction process_1 and process_2. Conventional tools are simply incapable of identifying such dynamic interactions because they are focused on data which flows from one code location to another code location. A method or system which allows the identification of dynamic interactions would be highly useful.

Figure 2:
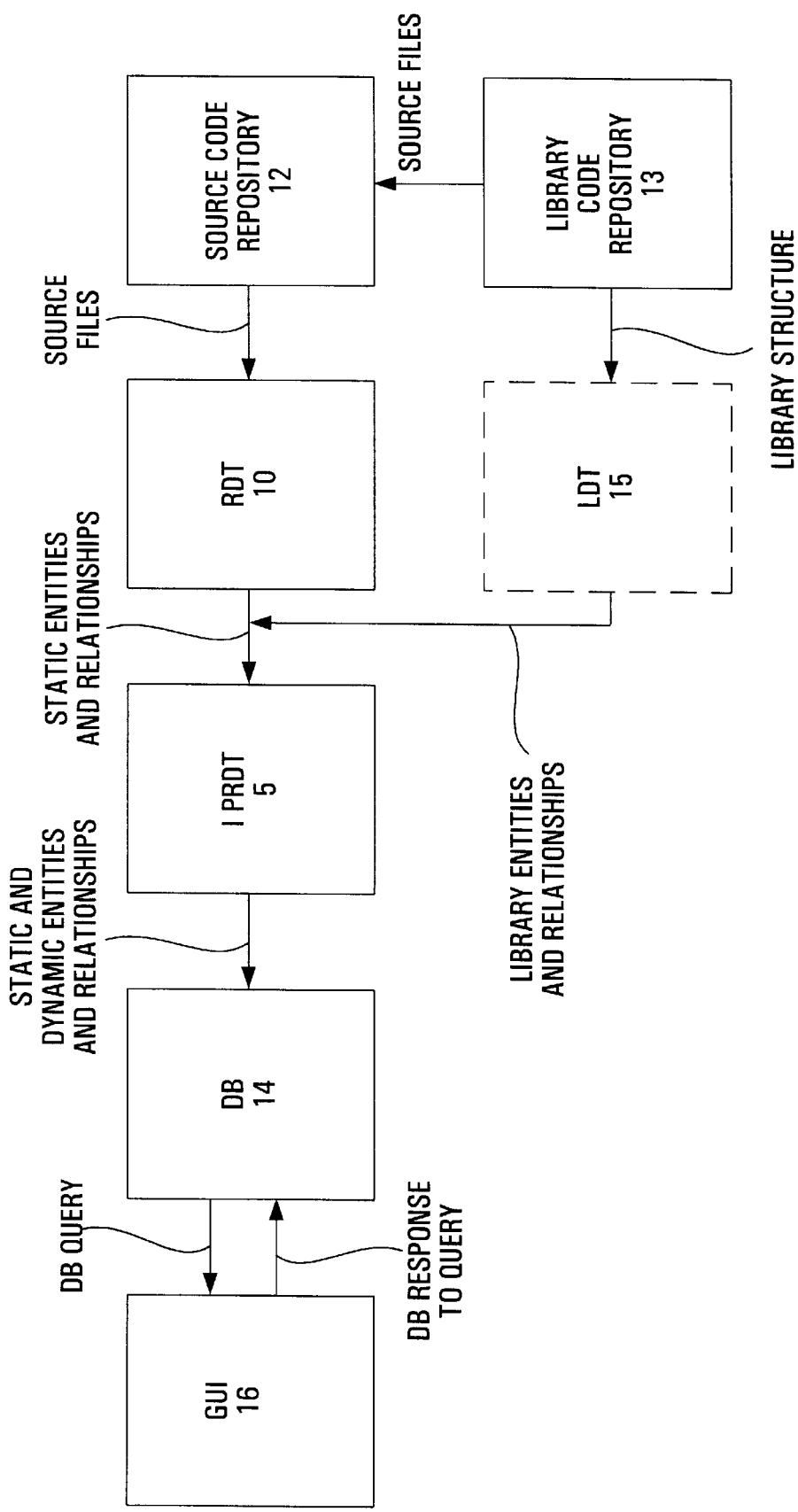
FIG. 2 is a block diagram of a system including an inter-process relationship definition tool (IPRDT)

Referring now to FIG. 2, an IPRDT (interprocess relationship definition tool) according to an embodiment of the invention is generally indicated by 5 and is deployed as part of a system which includes an RDT (relationship definition tool) 10, a source code repository 12 (also referred to as a load), a library code repository 13, the IPRDT 5, and a GUI (graphical user interface) 16. The RDT 10 is a software application capable of analysing source code contained in source files stored in the source code repository 12, and extracting static software structure within the source code and identifying indirect messaging relationships and outputting these to the IPRDT 5. The IPRDT is a software application capable of extracting inter-process indirect messaging relationships.

The source code repository 12 contains the source code to be analysed by the RDT 10 and the IPRDT 5 and may be implemented using any known code storage mechanism. The source code repository contains a "physical hierarchy" of software entities. Source files, procedures, functions and variables, for example are referred to as physical software entities because they actually exist and take up storage space.

The library code repository 13 is where the source code is backed up and version controlled. These types of repositories are used with most software developments to provide a formal method of tracking and reproducing version controlled software loads. The source code repository 12 contains selected versions of the code stored in the library code repository 13. The library code repository 13 also plays a role in software partitioning, providing a logical hierarchy of software entities. The library structure's logical hierarchy is available to the database 14 in the form of library entities and their relationships. Depending upon the nature of the library code repository 13, an LDT (library definition tool) 15 (see FIG. 2, shown in phantom) may be provided for analysing the library structure of the library code repository and extracting library entities and relationships.

Figure 3:
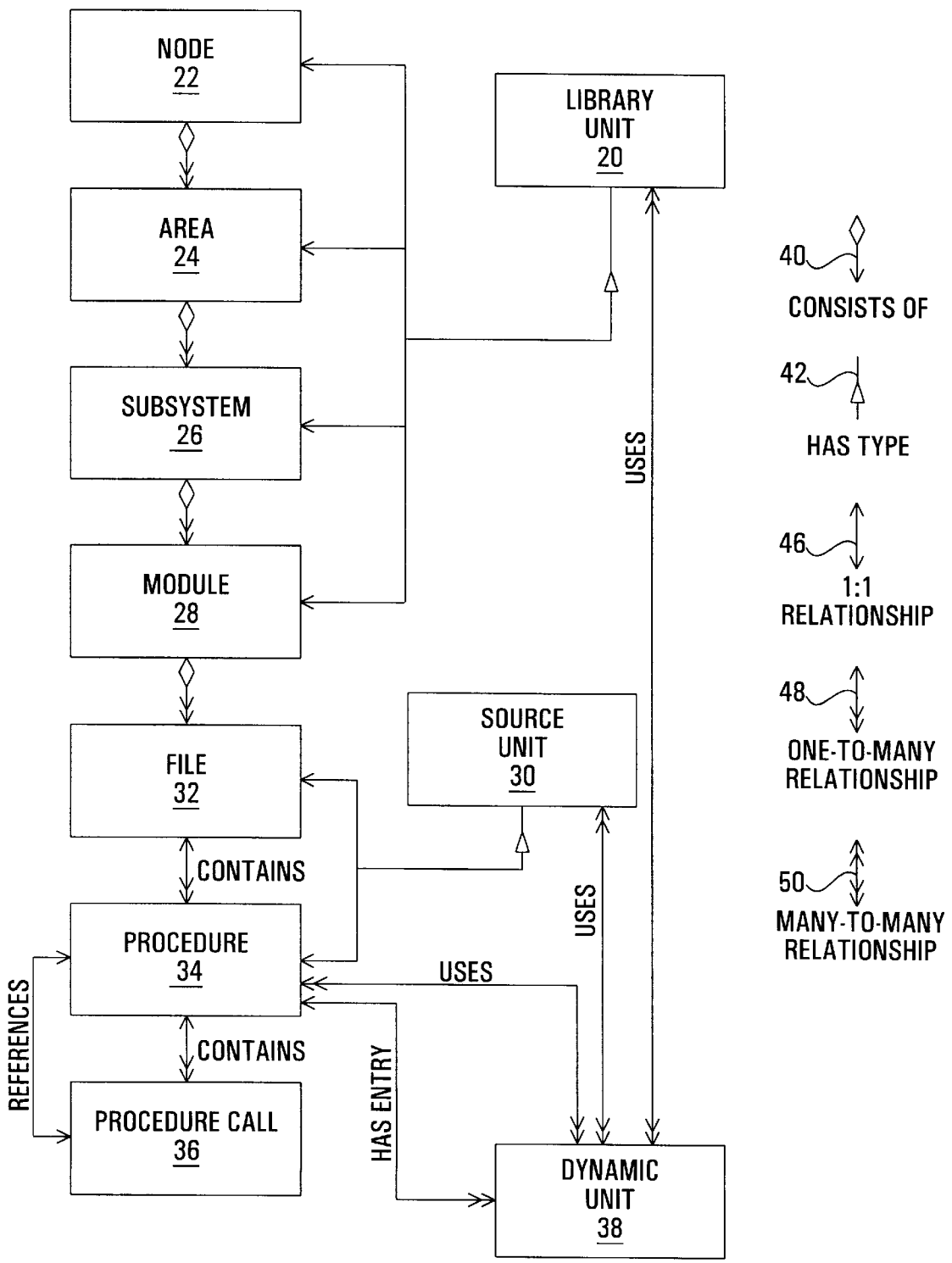
FIG. 3 is a containment hierarchy.

An example of the relationships between the source code repository 12, the library code repository 13 and dynamic units (typically processes) is shown in FIG. 3. The library code repository 13 consists of library units 20 such as nodes 22, areas 24, subsystems 26, and modules 28. The source code repository 12 consists of source units 30 such as files 32 and procedures 34 contained in files. Procedures 34 may contain procedure calls 36 and may create, start, stop, or destroy dynamic units 38. Dynamic units 38 use library units 20 and use source units 30. Modules 28 consist of a collection of files 32. The various relationships between the different entities are indicated by the "consists of" symbol 40, the "has type" symbol 42, the "1:1 relationship" symbol 46, and the "one-to-many relationship" symbol 48, and the "many-to-many relationships" symbol 50. Files 32 are physical entities which may also be referred to as "sections" in the logical library structure. In other words, a section identified within a module 28 is in one to one correspondence with a file 32.

It is noted that other than the IPRDT 5 the all remaining features of FIG. 2 are to be considered optional. For systems which do not employ a logical hierarchy defined within a library code repository 13, only the physical hierarchy defined in the source code repository 12 would be used. The relationships identified by the IPRDT 10 are useful in their own right and as such the database 14 and GUI 16 are not necessary for some applications. Furthermore, the static software structure and indirect messaging relationships may be viewed as raw input to the IPRDT 5 in which case the RDT 10 and the source code repository 12 are not required.

When present, the database 14 may be any off-the shelf commercial database or may be a custom database, and is preferably a relational database. The database would be used to store the output of the IPRDT and the RDT. When present, the GUI 16 includes functionality for a user to generate queries to the database 14, functionality to receive the response to such queries from the database, and functionality for producing various forms of graphical output on the basis of these results. It is to be understood that while the IPRDT 5, RDT 10, database 14 and GUI 16 may each be implemented on a respective processing platform, two or more of these functions may be implemented on the same processing platform.

Figure 4:
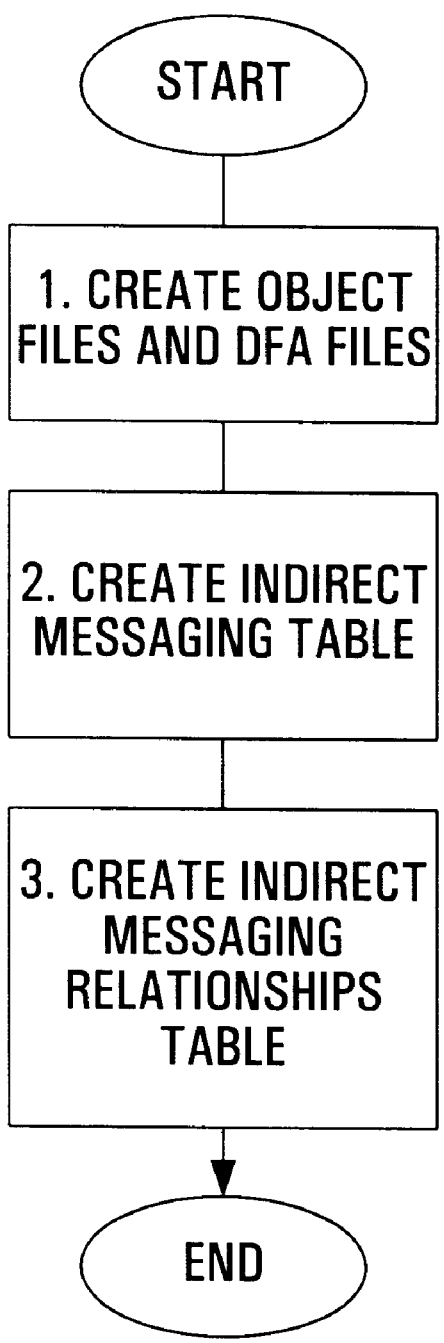
FIG. 4 is a top-level flowchart for a method implemented by the relationship definition tool of FIG. 2.

A very high level flowchart for the functionality implemented by the RDT 10 of FIG. 2 is shown in FIG. 4. The steps in this flowchart will be described briefly by way of overview, and then each step will be described in detail. Step one is to create an object file and a DFA (data flow analysis) file for each source file stored in the source code repository. Step two is to create an indirect messaging table which contains a list of all procedure calls which are interface procedure calls. Step three is to create an indirect messaging relationships table by identifying all pairs of records in the indirect messaging table consisting of a first record relating to performing a "send" interface procedure on a communications object, and a second record relating to performing a "receive" interface procedure on the same communications object.

In the detailed description of the three steps appearing in the flowchart of FIG. 4 which follows, it is assumed that all indirect messaging is achieved through communications objects which are ultimately associated with global entities, and that these global entities are permanently and exclusively associated with the communications objects they identify. Communications objects may be directly associated with global entities such as global variables, global array elements, etc. Alternatively, the association may be a "complex" association in the sense that the communications object is directly associated with some local entity which is ultimately assigned to equal one or more global entities. In this case, it is the one or more global entities ultimately used in place of the local entity which satisfy the constraint that all communications are ultimately associated with global entities.

The symbolic names of these global entities will be referred to as communications object identifiers, or COIDs. It is also assumed that these global entities are single assignment global entities. That is to say, they are assigned a value once at some point during the execution of the software, and are not reassigned. This results in the assumptions that wherever a particular symbolic name appears, during run time the same physical communications object would be referenced, and that whenever different symbolic names appear, during run time different physical communications objects are being referenced. Finally, it is also assumed that in the source code, the same global entity (and as such the same communications object) is used in both a receive type interface procedure call and a send type interface procedure call. Interface procedures and their types (receive and send among others) are described in further detail below.

It is to be noted that the terminology "function" and "procedure" is in general operating system specific in meaning and that some operating systems may use other names for static functional software entities. For example, in many cases, a function call differs from a procedure call only in that there is a return value. For the purpose of this description the term "procedure" will encompass any static functional software entity, whether it provides a return value or not.

Step One: Create Object Files and DFA Files

An object file is a file generated for each source file which contains a record for each construct which uses at least one global entity, these constructs including basic code entities within the source file, and including basic relationships within the source file. The basic code entities for example include file definitions, variable definitions, type definitions, procedure definitions and constant definitions. The basic relationships may for example include all occurrences of:

file defines {procedure, variable, type, constant};
procedure used/calls procedure;
file uses {file, variable, type, constant}

Similarly, the DFA file is a file generated for each source file which contains a record for each construct which uses non-global entities.

Figure 5:
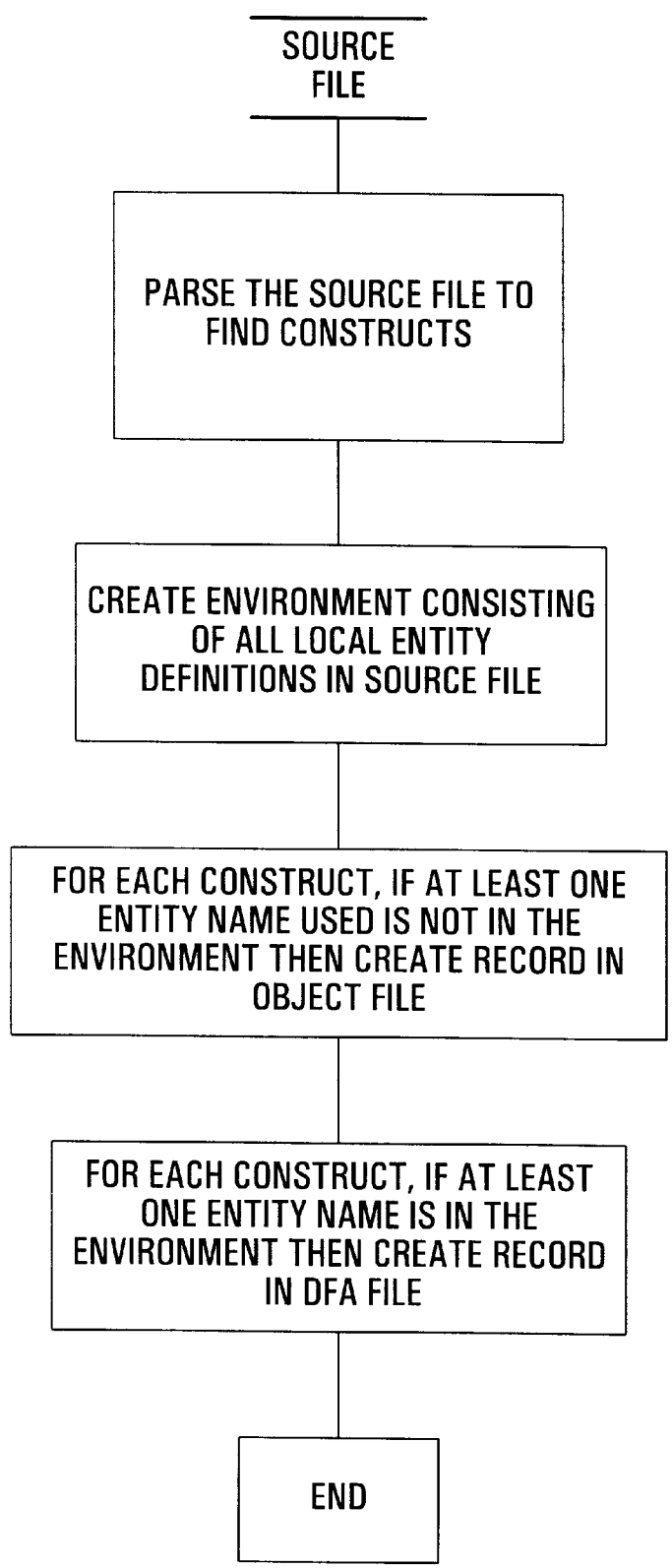
FIG. 5 is a flowchart for the step "Create Object Files and DFA Files" appearing in FIG. 4.

Referring now to FIG. 5, the steps taken to create an object file and a DFA file for a given source file will be described, these steps being performed for each source file. Firstly, the source file is parsed to find all constructs, a construct being a statement in a source file including data definitions, procedure definitions, block statements, assignment statements, procedure call statements, conditional statements etc. Parsing is well known in the art and will not be described further. Next, an "environment" is created for that source file consisting of all local entities defined in the source file. This may for example be created by determining all local definitions within each block in the source file to be the "scope" of that block, and then by combining all of the scopes as the environment. The contents of the scope distinguish between local and non-local entities with local entities being included and non-local entities not being included. The contents of the environment distinguish between global and non-global entities with non-global entities being included and global entities not being included. Each construct is checked to determine if it uses any global entity(s). This is done by checking for each entity used to see if it is in the environment. If not, then the entity is assumed global. For each construct using at least one global entity, a record in the object file is created. Finally for each construct which uses at least one non-global entity, a record in the DFA file is created.

Each record in the object file created in step one is preferably categorized in the object file during the creation of the object file by basic entity type for basic entity objects, and by basic relationship type for basic relationship objects. Thus, for the example given above, the object file will include the following categories:

file definitions;

variable definitions;

type definitions;

procedure definitions;

constant definitions;

procedure uses/calls procedure;

file uses procedure;

procedure uses variable;

procedure uses type; and procedure uses constant.

Each entry in the object file also preferably includes information which permits the identification of where the respective basic code entity or basic relationship appeared in the source code. For example, for the "procedure calls procedure" category of basic relationship, each record preferably contains a symbolic name (or other identifier) of the calling procedure, a symbolic name (or other identifier) of the called procedure, one or more fields which identify part of the source code repository where the procedure call occurs, and a line number where the procedure call appears in the source code within a source file. The fields which identify the part of the source code repository where the procedure call occurs are dependent upon the manner in which source code is grouped in the source code repository. This is discussed in greater detail later.

Each entry in the DFA file is similarly categorized and contains similar information.

Step Two: Create Indirect Messaging Table

Assuming the above discussed categorization is performed in the creation of the object files and DFA files in step one, then all constructs of the form "procedure calls procedure" have already been identified. The indirect messaging table consists of an identification of a subset of the procedure calls procedure constructs which are "interface procedure calls".

Before being able to perform this step, a set of procedure calls which are considered interface procedure calls must be defined. Information identifying interface procedure calls and several of their important characteristics are stored in a file which will be referred to as an IDF (interface description file). The IDF is an input to step two.

The IDF contains a definition of each type of interface procedure or indirect messaging interface which is to be captured. A preferred format for records in the IDF and two examples of such records are shown in Table 1.

TABLE 1

IDF Record Format and Example IDF Records

| IDF field Name | Example IDF Record 1 | Example IDF Record 2 |
| --- | --- | --- |
| procedure Name | q_send | q_receive |
| procedure Type | "s" | "r" |
| Type of service | queue | queue |
| Position of COID within procedure call | 1 | 1 |

The fields in the IDF record include a procedure name field, a procedure type field, a type of service field, and a "position of COID within procedure call" field. The procedure name field contains the symbolic name of an interface procedure as it would appear in source code. The procedure type is either "c" for create, "r" for receive, "s" for send, or "o" for other. There may be many different procedures relating to receiving for example, and all of these would have the same procedure type, namely "r". The interface procedure, when called, contains one or more parameters at least one of which is a communications object having a COID (communications object identifier) of a certain type. The COID is a global entity symbolic name which either directly identifies the communications object appearing in the procedure call, or which identifies a global entity ultimately associated with the communications object appearing in the procedure call. The "type of service" identifies the particular messaging service/paradigm being used for the particular communication. For operating systems that support the C language, for example the pSOS operating system environment, these message types include signal, queue, event, semaphore. The "position of COID within procedure call" identifies where the global entity having that COID is located within the one or more parameters of the procedure call. There will be a different IDF for each software language and operating system. For a given software language and operating system, there will be a number of standard entries in the IDF. In addition, there may be a number of entries which relate to interface capabilities provided by application specific messaging paradigms implemented by application software used in conjunction with the OS. For example, it may be that the certain software entities in the source code are designed to communicate with each other (when compiled, linked and run etc.) through a database application. In this case, the first entity writes to the database, and the second entity reads from the database. Assuming this type of relationship between the first and second entities is of interest, entries for these database read and write procedures are included in the IDF. Example IDF record 1 pertains to the C function "q_send" which has procedure type "s" and has message type "queue". Example IDF record 2 pertains to the C function "q_receive" which has procedure type "r" and has message type "queue."

Sender interface procedures, namely interface procedures which are assigned interface procedure type "s" include any procedures which do something with "write" permission to a communications object. These include write procedures, modify procedures, delete procedures to name a few examples.

Receive interface procedures, namely interface procedures which are assigned interface procedure type "r" include any procedures which do something with "read" permission on the basis of a communications object. These include read and receive procedures for example.

Figure 6:
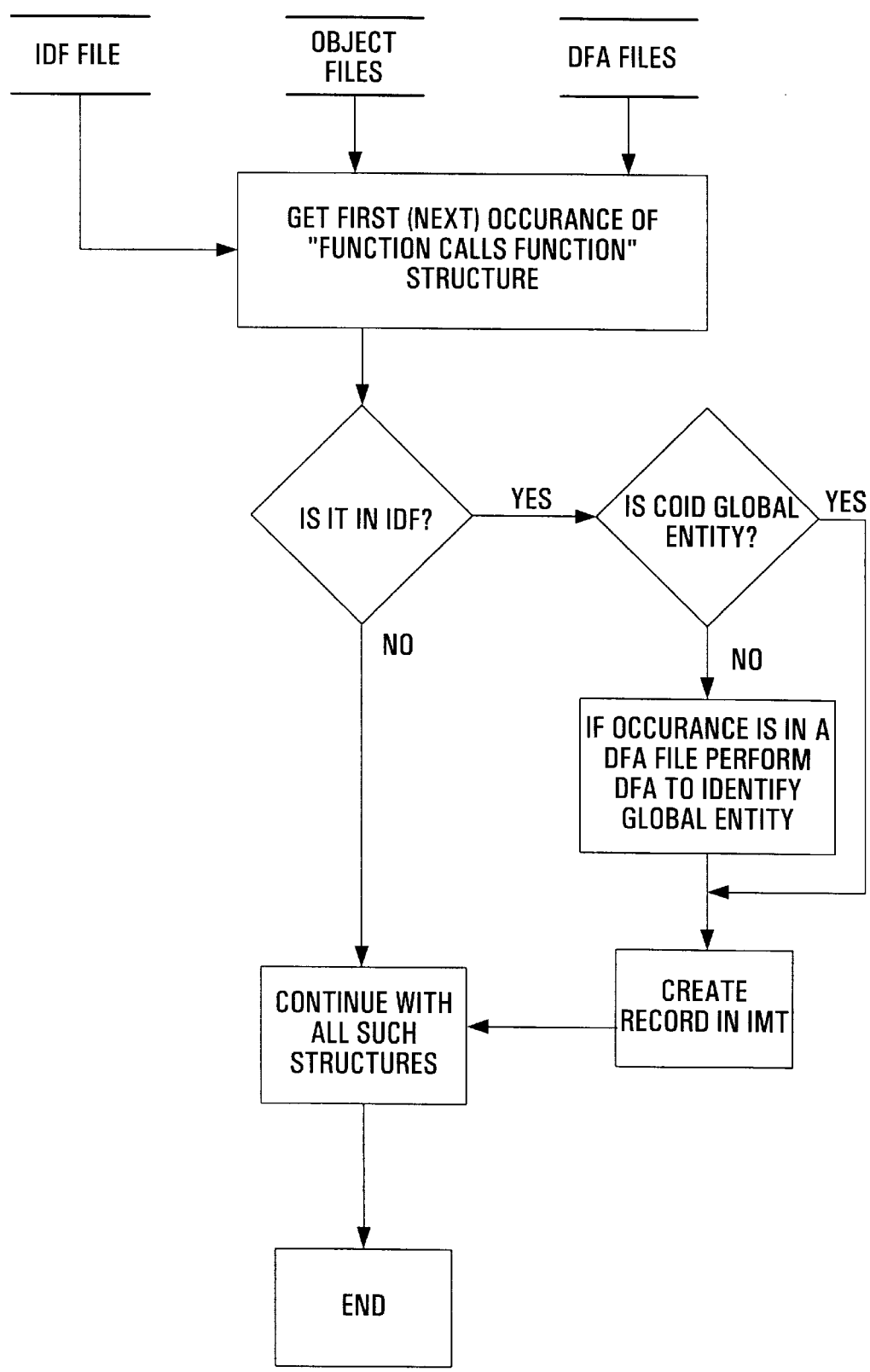
FIG. 6 is a flowchart for the step "Create Indirect Messaging Table" appearing in FIG. 4.

In step two, each record in the set of records in the object files and the DFA files pertaining to "procedure calls procedure" construct is examined to see if the called procedure is any one of the procedures included in the IDF. A flowchart for this step is shown in FIG. 6.

As identified previously, the indirect messaging table is a table in which is stored all occurrences of procedures calling interface procedures. A preferred format for records in the indirect messaging table and two examples of such records are shown in Table 2. Example record A is an example of a record which uses the interface procedure defined in example IDF record 1 of Table 1, and example record B is an example of a record which uses the interface procedure defined in example IDF record 2 of Table 1. As was the case for the format of basic relationships in the object file, the format of the records in the indirect messaging table will be partially dependent upon how software entities are grouped within the software depository. In the examples of Table 2, it is assumed that interface procedures are called from procedures contained in files.

TABLE 2

Indirect Messaging Table Record Format and Example

| Field Name | Example Record A | Example Record B |
| --- | --- | --- |
| File Name | file_A | file_B |
| procedure where called | proc_A | proc_B |
| interface procedure Name | q_send | q_receive |
| Communications Object Identifier | GV1 | GV1 |
| line number | 100 | 200 |
| Type of service | queue | queue |
| Procedure Type {c,r,s,o} | s | r |

The fields in the indirect messaging table record include the name of the interface procedure being called, the procedure within which the interface procedure is called, and the file containing that procedure. The interface procedure name field must be one of the procedures identified in the "procedure name" field of a record in the IDF. The "position of the COID within procedure call" is obtained from the field of the same name in the relevant record of the IDF and the global entity name directly or ultimately associated with the object in the object position within the procedure call identified by the "position of COID within procedure call" field is placed in the "Communications Object Identifier" field. The line number identifying where the interface procedure was called is included in the "line number" field. Finally, the "type of service" and procedure type fields of the indirect messaging record contain the "type of service" and "procedure type" copied from the fields of the same names in the relevant record of the IDF.

For constructs in the object files, if the entity in the "position of COID within procedure call" is non-global, then DFA may be performed to identify the global entity or entities ultimately associated with the non-global entity, with a record or records then generated on the basis of any such non-global entities identified. Alternatively, the record can be discarded with the understanding that it will be picked up when processing a DFA file record containing the same construct. The latter approach is preferred as it avoids duplicate records in the IMT which must be identified and eliminated. In what follows, the latter approach is assumed.

For the example parameters appearing in Table 2 above, the interface procedure calls in the source code might look like the following:

q_send(GV1,x,y,z) for example contents A; and q_receive(GV1,b,c) for example contents B.

For records in the DFA file, if the entity in the "position of COID within procedure call" is global, then a record in the IMT will have been created while processing a related object file record and the DFA record may be discarded.

For records in the DFA file which have non-global entities in the field identified by the "position of COID within procedure call", DFA is performed to identify one or more global entities which are ultimately associated with the entity in that position. A record in the indirect messaging table is created for each such global entity identified, these records taking the same form as those described with reference to Table 2 above. DFA in this context is the process of tracking local entity usage back to its global source(s). Techniques for performing DFA to achieve such ends are well known in the art and will not be described further herein.

Step Three: Identify Pairs of Records and Create Indirect Messaging Relationships Table In this step, the indirect messaging table is examined for pairs of records which together constitute a relationship. A relationship exists when one procedure is using a "send" type interface procedure with respect to a particular communications object, and another procedure is using a "receive" type interface procedure with respect to the same communications object. A table defined as an "Indirect Messaging Relationships Table" is created and is used to store a record for each such relationship. These records are categorized according to the particular message type.

An example record format for the C message type "queue" is shown in Table 3. A relationship having the "queue" message type would be identified for the two example indirect messaging table records of Table 2 because record A is a "send" type interface procedure (has type "s"), record B is a "receive" type interface procedure (has type "r"), and they both relate to the communications object GV1. Table 3 contains an example of an indirect messaging relationships record contents pertaining to the records of Table 2.

TABLE 3

Indirect Messaging Relationships Table Record Format for C Queue Message Type and Example

| Field Name | Example Contents |
| --- | --- |
| file_sender | file_A |
| proc_sender | proc_A |
| sender_line_no | 100 |
| file_receiver | file_B |
| proc_receiver | proc_B |
| receiver_line_no | 200 |
| COID | GV1 |

Of course, since most of the contents of the indirect messaging relationships table are already present in the indirect messaging table, a more concise version of the indirect messaging relationships table may be realized by simply including in each record a record ID together with pointers to the send and receive records in the indirect messaging table.

Figure 7:
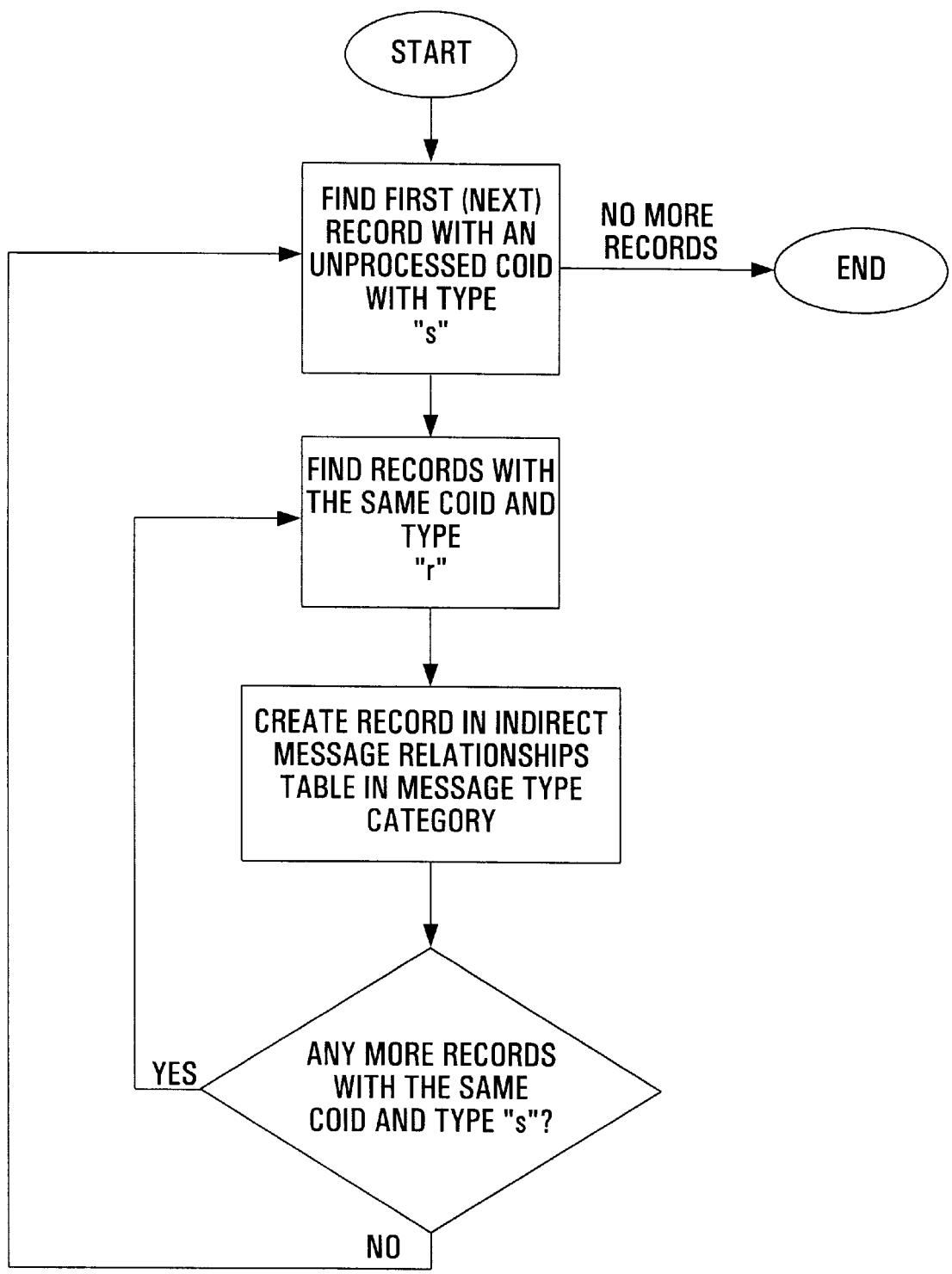
FIG. 7 is a flowchart for the step "Create Indirect Messaging Relationships Table" appearing in FIG. 4.

A flowchart for a method of identifying indirect messaging relationships is shown in FIG. 7. Firstly, the records in the indirect messaging table are examined in sequence for the first (next) record having an unprocessed COID and having type "s". Next, the remaining records are examined for any records having the same COID and having a procedure type "r". For each such record, an entry in the indirect messaging relationships table is created. After all of the records have been examined, the entire process is repeated for the next and all subsequent unprocessed COIDs having type "s". While a very specific method of identifying indirect messaging relationships from the indirect messaging table records has been described, it is to be understood that other methods may be employed within the scope of the invention.

Notes on Interface Procedures Using Local Variables

In the above described embodiment of the RDT, it was assumed that in some cases, local variables were used in interface procedure calls to identify communications objects.

Consider the following example in which it is assumed that q receive is an "r" type interface procedure, q_send is an "s" type interface procedure, local_1 is a local variable, Q1, Q2 are global variables, and RF,RF1,RF2,SF are procedures defined as follows:

```
RF   {
     q_receive(local_1)
     }
RF1  {
     RF(Q)
     }
RF2  {
     RF(Q1)
     }
SF   {
     q_send (Q1)
     }
```

In this example, there is a relationship between the procedures SF and RF2 because SF is a send procedure for Q1 and RF1 is indirectly a receive procedure for Q1.

In some circumstances, omitting such relationships may not pose a problem. This is because identifying relationships which directly use global entities will in most cases identify a large percentage of relationships. As such, it is contemplated that if the complex relationships are not of interest, then the creation and processing of the DFA files, and the DFA processing of local entity names within records in the object file are not necessary. However, in the event that these relationships are also to be captured, an interface procedure call containing a local variable located where a communications object identified by a global variable symbolic name would otherwise be expected, may be supplemented by a list of global variables whose values the local variable may be assigned using the above referenced DFA techniques. In the above example, the local variable local_1 may be assigned the values Q, as in the procedure RF1, or Q1, as in the procedure RF2, and as such the list {Q,Q1} is associated with the local variable local_1. This list is preferably generated automatically. In some cases, it may be necessary to follow the local variable through several procedure calls before finding the global variable(s) it actually represents. For the purposes of the creation of the indirect messaging table, a separate record would then be created for each possible global variable listed in association with the local variable.

Figure 8A:
FIGS. 8A and 8B are graphical representations of example indirect messaging relationships.
Figure 8B:

In the above described example it has been assumed that the source code consists of files which contain procedures which contain procedure calls. This is shown diagramatically in FIG. 3 where a file 32 is shown to contain a procedure 34 which contains a procedure call 36. Using the system and method provided by the invention on this example, a particular relationship will identify a sender interface procedure by a particular procedure containing the sender interface procedure call, and a particular file containing the particular procedure. These may be referred to as the send procedure and the send file respectively. Similarly, the receive interface procedure will be identified in the relationship by a particular procedure containing the receive interface procedure, and a particular file containing the particular procedure. These may be referred to as the receive procedure and the receive file respectively. Such a relationship is very rich in information. It identifies a messaging relationship between the send procedure and the receive procedure. It identifies a messaging relationship between the send file and the receive file. Thus, for the example in Table 3, relationships may be identified between proc_A and proc_B, and between file_A and file_B. These three types of relationships are illustrated in FIGS. 8A–8B respectively.

More generally, it is to be understood that depending upon the nature of the source code contained in the source code repository, procedures may be grouped in many different ways on many different levels. At the very bottom level, there will always be some software entity which contains a call to a "send" interface procedure and another software entity which contains a call to a "receive" interface procedure. These software entities may be referred to as "Level 1" entities (and in the above described example these are procedures containing interface procedure calls). Groups of level 1 entities may be arbitrarily combined to form "Level 2" entities (and in the above described example these are procedures). Groups of Level 2 entities may be arbitrarily combined to form "Level 3" entities (and in the above described example these are files). Any number N of levels may be defined, and generally, entities may be categorized from Level 1 to Level N. These levels and their contents may be manually defined for a particular source code repository for the purposes of the RDT, and/or may exist due to the structure of the source code repository. The methods and systems provided by the invention identify basic indirect messaging relationships between Level 1 entities which inherently identify relationships between higher level entities. The relationships do not even need to involve entities on the same level. For example, it might be of interest to determine all Level 2 entities which interact with a particular Level 3 entity (in the above level example definitions, this would involve determining all procedures which interact with a particular file). The structure of the basic indirect messaging relationships identified permits such a determination to be made with a simple database query.

Furthermore, it is to be understood that these levels may include logical groupings such as defined in a library code repository for example, when present. By associating all logical and physical levels/groupings with each interface procedure call, it is possible to identify relationships between physical entities, between logical entities, or between physical and logical entities.

An example of an IDF for the "C" language is given in FIG. 9. In this example, the first twenty-seven entries 60 are specific to the OS (pSOS) language, and the remaining two entries 62 are application based entries.

All constructs could be stored in a single file (the object for example) with DFA being conditionally performed if the object in the COID position is a non-global entity.

Furthermore, the object files and DFA files are convenient ways of organizing constructs. Alternatively the interface procedure calls may be searched for directly in the source code files in which case the object files and DFA files are not required.

Referring again to FIG. 2, the IPRDT 5 has as a first input the static structure of the software stored in the source code repository 12, and has as a second input an identification of all indirect messaging relationships existent in the source code repository, both as identified by the RDT 10 as described in detail above.

For the purpose of example, the static structure will be assumed to contain at least a module_uses_section table, a proc_const_table, a proc_uses_proc (procedure uses procedure) table and a proc_calls_proc (procedure calls procedure) table.

The module_uses_section table has the following structure: module_id; section_id. Module_id is the name of a module, and section_id is the name of a section used by the module.

The proc_const table has the following structure: section_id; id_name; line_no; impl_section_id; impl_line_no. Section_id identifies the section in which the procedure is defined. Id_name is the logical name of the procedure. Line number is the line within the definition section section_id at which the procedure is defined. Impl_section is the section within which the procedure is actually implemented. Impl_line_no is the line number within the implementation section at which the implementation starts.

The proc_uses proc table has the following structure user_section_id; user_id_name; section_id; id_name; line_no. The field user_section_id is the name of the section of the using procedure. The field user_id_name is the name of the using procedure. The field section_id is the name of the section of the used procedure. The field id_name is the name of the used procedure. The field line_no is the line number within the user section at which the used procedure is used.

The proc_calls_proc table has the following structure: caller_section_id; caller_id_name; section_id; id_name; line_no. The field caller_section_id is the name of the section of the calling procedure. The field caller_id_name is the name of the calling procedure. The field section_id is the name of the section of the called procedure. The field id_name is the name of the called procedure. The field line_no is the line number within the caller section at which the called procedure is called.

Figure 10:
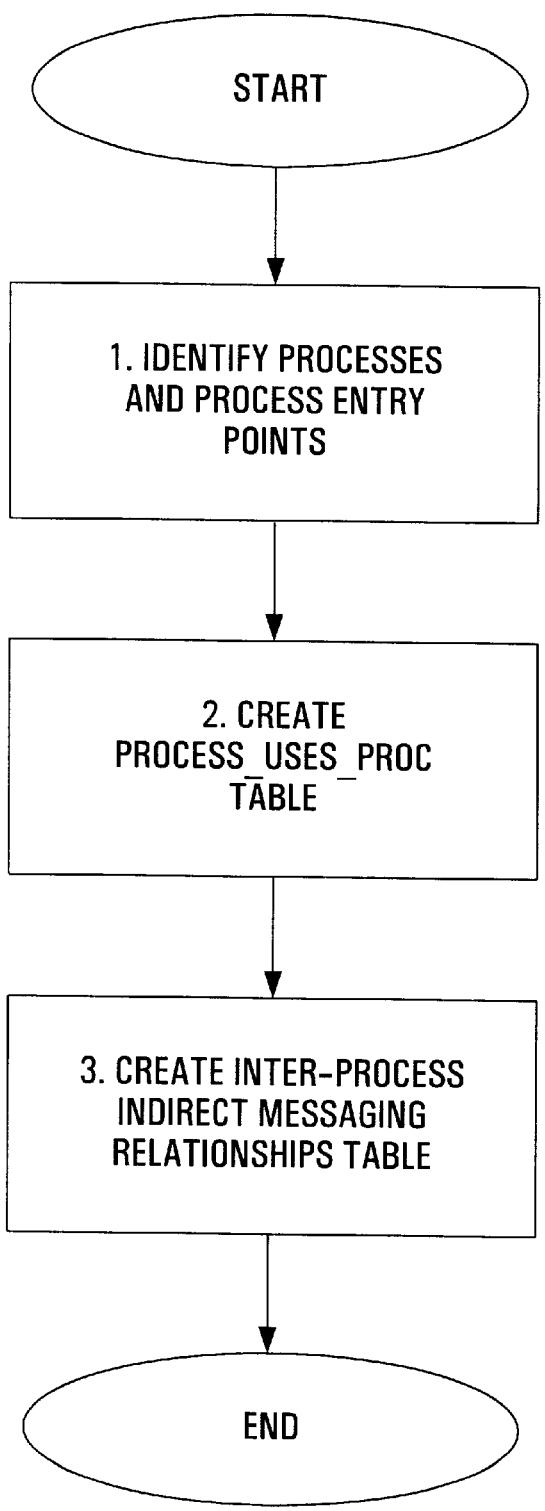
FIG. 10 is a top-level flowchart for a method implemented by the inter-process relationship definition tool of FIG. 2.

A very high level flowchart for the functionality implemented by the IPRDT 10 of FIG. 2 is shown in FIG. 10. The steps in this flowchart will be described briefly by way of overview, and then each step will be described in detail. Step one is to identify all processes and their associated process entry points. Step two is to create a "process_uses_proc" table. Step three is to create "inter-process indirect messaging relationships table".

Step One: Identify Processes and Process Entry Points

Each process has some sort of process reference which is used globally to identify the process. In addition, each process ultimately has some static software entity which is run first when the process begins, i.e. which is an "entry point" to the process. The purpose of this step is to match up process references with process entry points. The particular nature of this match up is very dependent upon the particular operating system.

Figure 11:
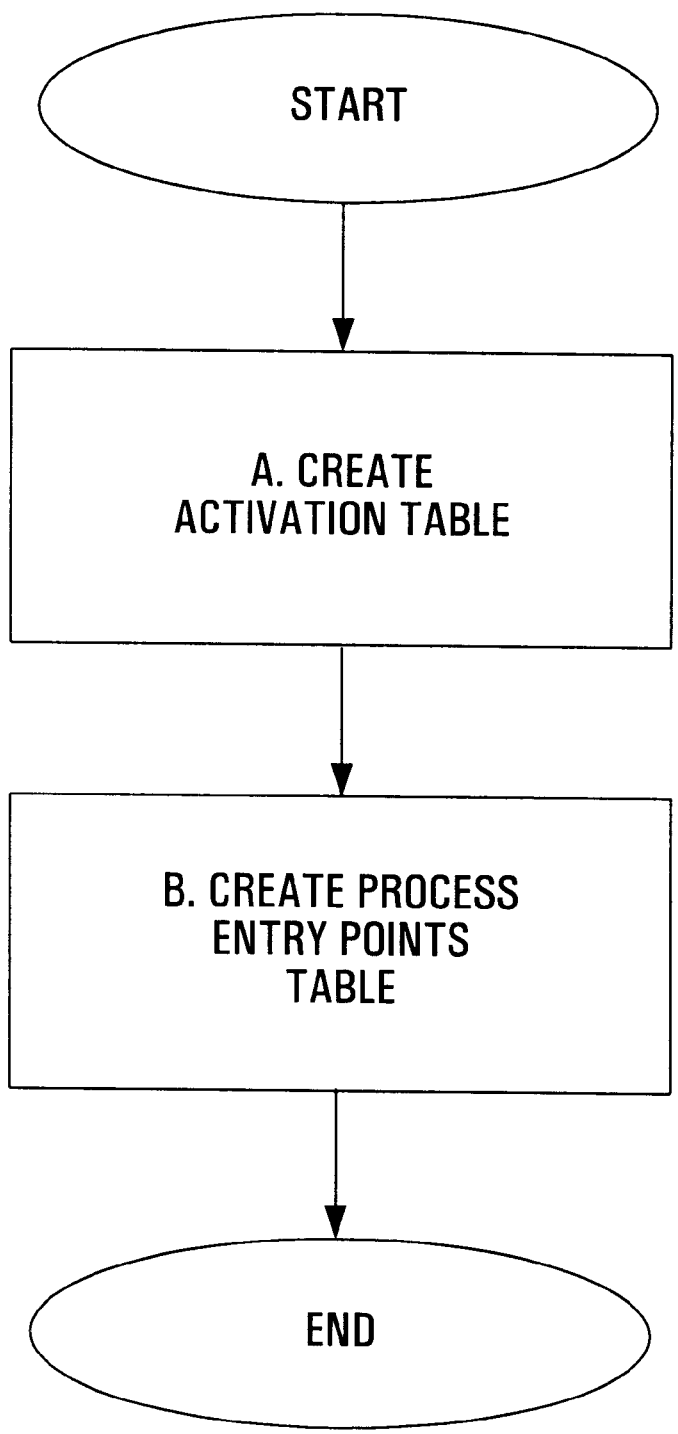
FIG. 11 is a flowchart for the step "Identify Process Entry Points" appearing in FIG. 10.

In the pSOS operating system used in some Northern Telecom switching systems for example, the process reference is a process name identified in a create process procedure call. The process create procedure call also contains a process identifier. The entry point is identified by an "entry_proc" contained in an associated start process procedure call. However, the start process procedure call does not include the process name, but does include the process identifier. The purpose of this step in the pSOS world is to match up each process name with an associated entry_proc. A flowchart for step one for the pSOS example is shown in FIG. 11, and contains two substeps, namely step A which consists of creating an "activation table" which contains a list of all process activation procedure calls, i.e. all procedure calls which relate to the creation of a process or processes or to the start of a process or processes. Step B is to create a process entry points table by identifying all pairs of records in the activation table consisting of a first record relating to performing a "create" procedure on a particular process, and a second record relating to performing a "start" procedure on the same process.

In step A, each record in the set of records in the object files and the DFA files pertaining to "procedure calls procedure" is examined to see if the called procedure is either a process create or a process start statement and each such record is stored in the activation table.

A preferred format for records in the activation table and two examples of such records are shown in Table 4. Example record A is an example of a record which uses the process create procedure call "t_create", and example record B is an example of a record which uses the process start procedure call "t_start". It is assumed that these procedures are called from procedures contained in files.

TABLE 4

Activation table Record Format and Example

| Field Name | Example Record A | Example Record B |
| --- | --- | --- |
| File Name | file_A | file_A |
| Procedure where called | proc_A | proc_A |
| Process Activation Procedure Name | t_create | t_start |
| line number | 100 | 200 |
| Procedure Type {create, start} | create | start |
| Priority | Pri_1 | |
| Process Identifier | PID_1 | PID 1 |
| Process name | process_1 | |
| Entry_proc name | | entry_proc_1 |

The fields in the activation table record include the name of the process activation procedure being called, the procedure within which the process activation procedure is called, and the file containing that procedure. The line number identifying where the process activation procedure was called is included in the "line number" field. The "procedure type" field identifies the process activation procedure as either a create or a start procedure. The "priority" field contains the priority of the process as defined in the create statement. The "process identifier" field contains the PID for the process. This field is filled in for both the create and the start statements. The "process name" field contains the symbolic name of the process. This is only present in the create statement. The entry_proc field contains the name of the entry procedure. This field is only present in the start statement.

Step A Identify Pairs of Records and Create Process Entry Points Table

In this step, process create and process start procedure calls are paired up such that the each process name can be linked with a corresponding entry_proc. A process creation relationship exists when one procedure is using a "create" type process actuation procedure with respect to a particular process identifier, and another procedure is using a "start" type process actuation procedure with respect to the same process identifier. A table defined as a "Process Entry Points table" is created and is used to store a record for each such pair of records. Such matching pairs of activation table records are correspondent to the creation and activation of the same process. An example record format is shown in Table 5.

TABLE 5

Process Entry Points Table Record Format and Example

| | |
|---|---|
| process_name | process_1 |
| process identifier | PID_1 |
| Priority | Pri_1 |
| entry_proc_name | entry_proc_1 |
| module_id | module_1 |
| section_id | section_1 |

The process_name is the symbolic name of the process extracted from the "create" record in the activation table. The priority is extracted from the activation table from the "create" record. The entry_proc_name is extracted from the "start" record. Depending upon the partitioning of the software, it may be necessary to include additional structural names in this record to uniquely identify the entry procedure. For example, for pSOS, the section (File), module and procedure_name will ensure a unique identification of a particular procedure. Thus the record may include a section_id field and a module_id field. These would be filled in on the basis of the static software structure identified by the RDT or the LDT of FIG. 2. The term "static structure" when used in conjunction with a particular procedure call will be used to refer to any and all static software entities required to uniquely identify the particular procedure.

Figure 12:
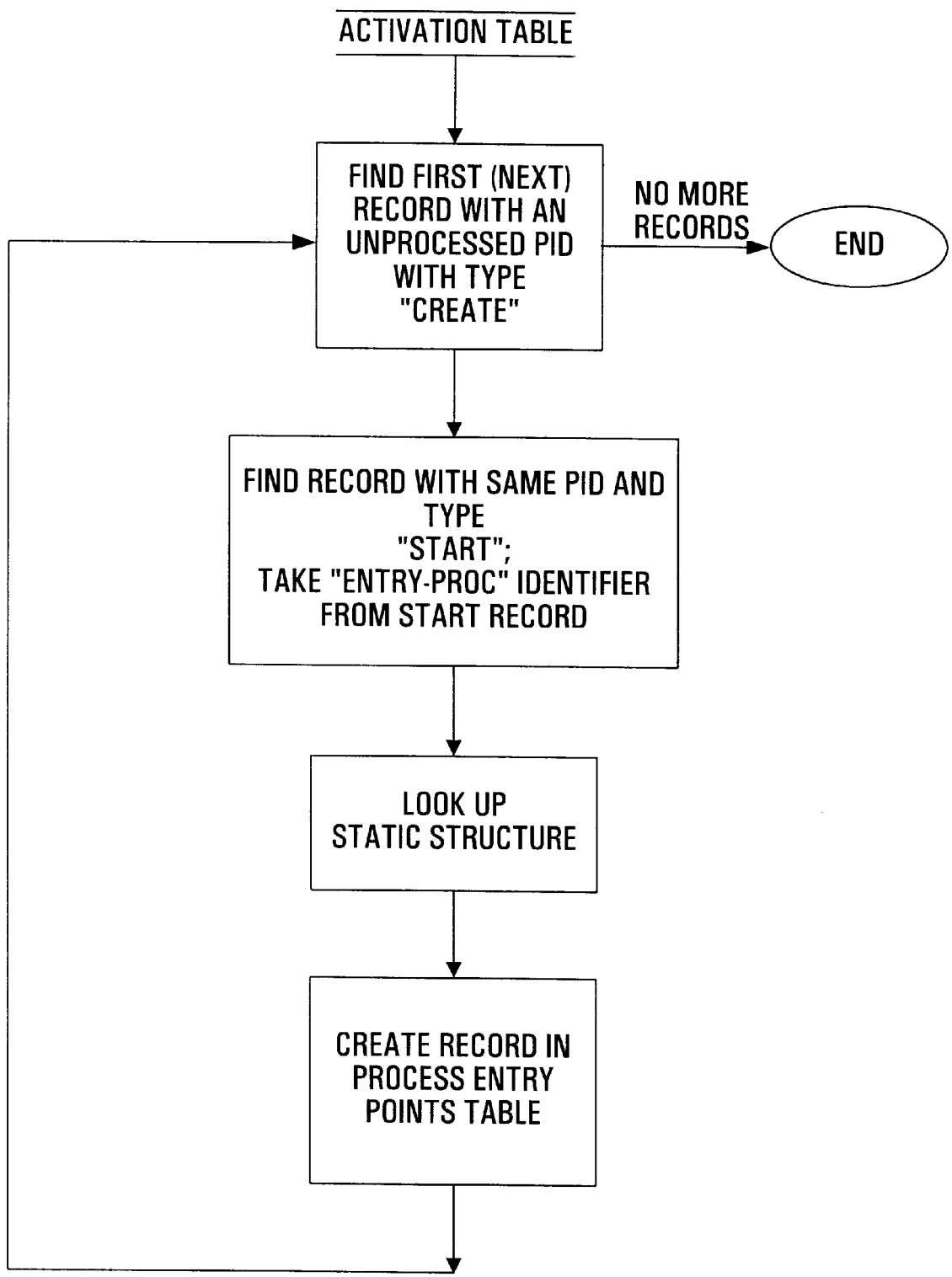
FIG. 12 is a flowchart for the step "Create Process Entry Points Table" appearing in FIG. 11.

A flowchart for a method of matching pairs of activation records is shown in FIG. 12. Firstly, the records in the activation table are examined in sequence for the first (next) record having an unprocessed PID and having type create. The process name in that record is extracted. Next, the remaining records are examined for any records having the same PID and having a type "start". When such a record is identified, the "entry_proc" identifier from the record having type start is extracted. The process name and entry_proc thus extracted are used to create a record in the process entry point table. The static structure needed to uniquely identify the entry procedure is also extracted and included in the corresponding process entry points table record. The entire process is repeated for the next and all subsequent unprocessed PIDs having type "create". While a very specific method of identifying process creation relationships from the activation table records has been described, it is to be understood that other methods may be employed within the scope of the invention.

Step Two: Create Process_uses_proc Table

In this step, a complete set of procedures which are called by each process is identified. A table defined as a "Process_uses_Proc" table is created and is used to store this information.

An example record format is shown in Table 6. A record for the example Process Entry Points table record of Table 5 would be created as described in detail below.

TABLE 6

Process_uses_Proc Record Format

| Field Name | Example Contents |
|---|---|
| process_name | process_1 |
| procedure_name | entry_proc_1 |
| module_id | module_1 |
| section_id | section_1 |

Figure 13:
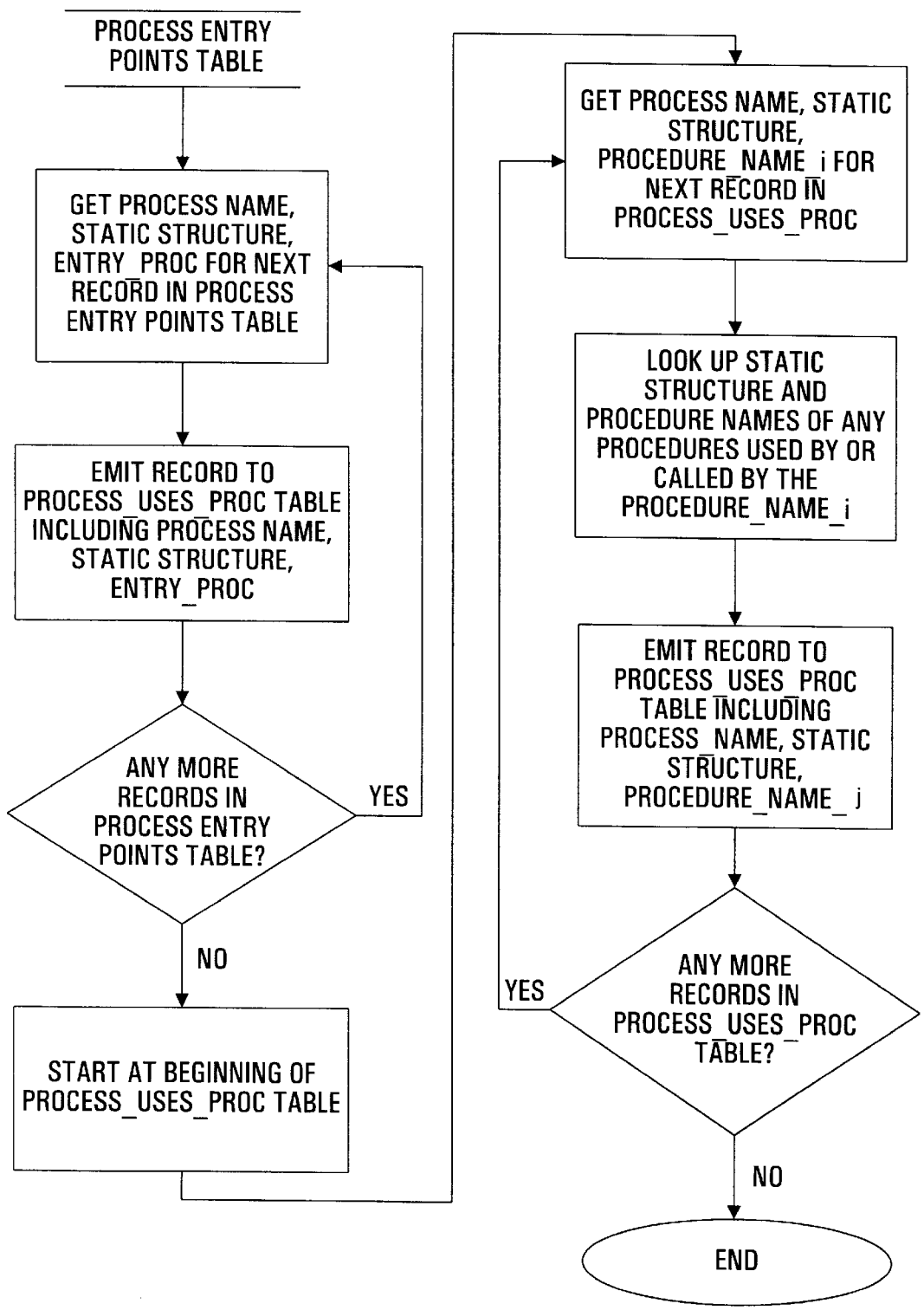
FIG. 13 is a flowchart for the step "Generate Process_use_Proc Table" appearing in FIG. 10.

A flowchart for this step is shown in FIG. 13. To begin, each entry in the process entry points table is examined in sequence. Then, a record in the process_uses_proc table is created consisting of the process_name, the entry_proc and any static structure needed to uniquely identify the entry_proc procedure thereby identifying that the process identified by the process_name name uses the procedure identified by the entry_proc field.

Next, an iterative procedure is performed to identify further records in the process_uses_proc table. Each record in the process_uses_proc table is read in sequence, starting at the beginning of the table. This involves for the ith record reading process_name_i, and procedure_name_i. Next, all the procedures called by the current one procedure_name_i are identified. This consists firstly of examining each record in the proc_calls_proc and the proc_uses_proc tables relating to procedure_name_i and extracting records of the form procedure_name_i, uses/calls procedure_name_j and the necessary static structure for procedure_name_j. A record in the process_uses_proc table is created consisting of process_name, procedure_name_j and the static structure for procedure_name_j. The new record is added to the end of the table such that, since the table is processed in sequence, the new record will itself be processed at a later time at which point it will not longer be the last record in the table. This is repeated until no new records are to be added to the table. Mathematically, this is a referred to as a "transitive closure".

Step Three: Create Inter-Process Indirect Messaging Table

Once the "Process_uses_Proc" table has been completed as described above, step three of the method comprises the extraction of inter-process indirect messaging relationships from this table. An input to this step is the previously described IMT (indirect messaging relationships table). This may have been produced in accordance with the above described method. Alternatively, the input may take any form which permits the identification of indirect messaging relationships between static functional entities.

Figure 14:
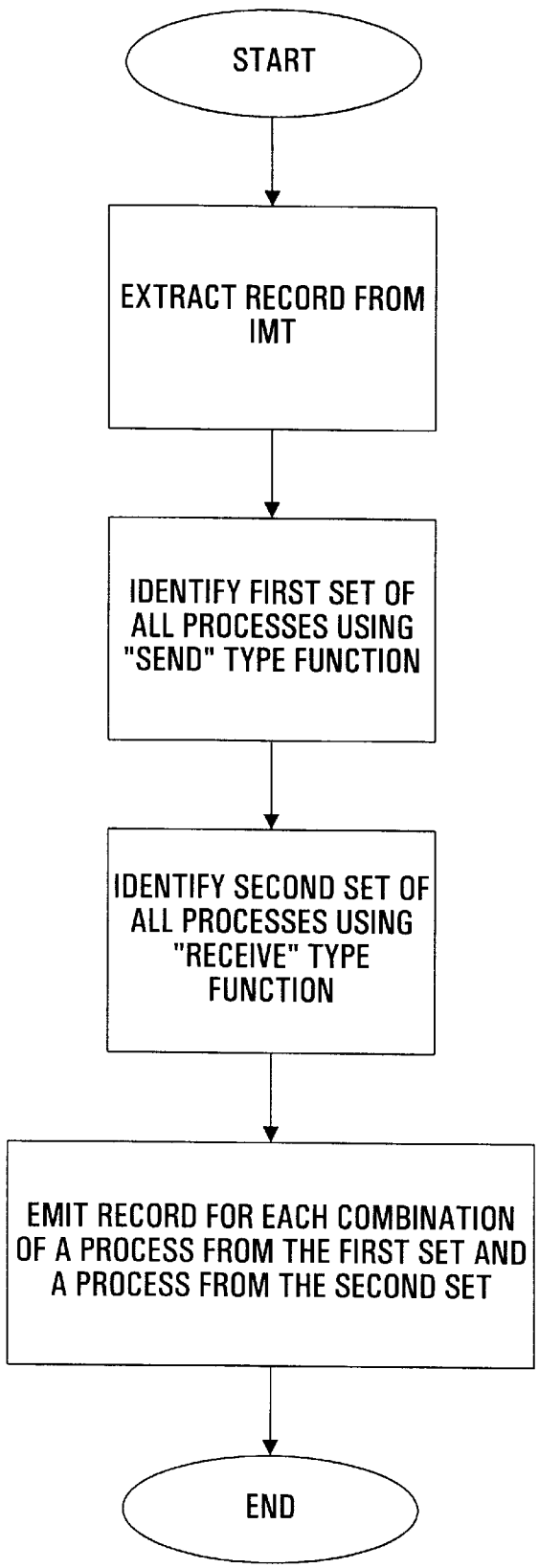
FIG. 14 is a flowchart of the steps "Create Inter-Process Indirect Messaging Table" appearing in FIG. 10.

A flowchart for this step is shown in FIG. 14. Assuming that it is the IMT which is used, each record in the table is examined in sequence. Recall each IMT record includes a first procedure using a "send" type procedure and a second procedure using "receive" type procedure with respect to a particular COID (communication object identified), thereby identifying an indirect relationship between the first procedure and the second procedure. The procedure using the "send" type procedure is first identified and used to look up in the "Process uses Proc" table a first set of process names consisting of all processes which use that procedure. Next, the procedure using the "receive" type procedure is identified and used to look up in the "Process uses Proc" table a second set of process names consisting of all processes which use that procedure.

Finally, a set of records in the inter-process indirect messaging table is created consisting of all possible pairs of process names which include one from the first set of process names and one from the second set of process names. Each such record identifies a potential inter-process indirect messaging relationship. Preferably, the COID is also extracted from the relevant record in the indirect messaging table and stored with each record in the process indirect messaging table. An example record format is shown in Table 7.

TABLE 7

Inter_Process Indirect Messaging Relationship Table

| Field Name | Example Contents |
|---|---|
| Process_name_sender | process_1 |
| Process_name_receiver | process_2 |
| COID | COID_1 |

This procedure is completed for each record in the IMT this identifying all possible inter-process indirect messaging relationship. These relationships may then optionally be stored in a database, and/or used to generate graphical output such as the relationship between process_1 ad process_2 depicted in FIG. 1D.

Alternatively, assuming the RDT of FIG. 10 and described in detail above is used, then the inter-process indirect messaging relationships may be captured as an extension to the above described indirect messaging table. This may be done by adding the two fields process_name_sender and process_name_receiver to each record in the IMT. The IMT record format of Table 3 above thus modified has the format of Table 8 below:

TABLE 8

Indirect Messaging Relationships Table Record Format for C Queue Message Type and Example Including Inter-Process Parameters

| Field Name | Example Contents |
|---|---|
| file_sender | tile_A |
| proc_sender | proc_A |
| sender_line_no | 100 |
| file_receiver | file_B |
| proc_receiver | proc_B |
| receiver_line_no | 200 |
| COID | GV1 |
| process_name_sender | process_1 |
| process_name_receiver | process_2 |

In the above described embodiment, it has been assumed that processes are identified by process names and that the first procedure in a process is identified by an entry procedure for that process. Furthermore, it is assumed that processes are created and started independently, and that create and start commands must be matched up in order to match process entry points with process references. The entry procedure is then used as a starting point to identify all procedures which may be called/used in that process.

More generally, any method of identifying a set of possible called/used procedures associated with some sort of process reference which is identifiable within the source code may be used. The particular method used may depend upon the operating system employed. For example, in the UNIX operating system, processes do not have process names, but only have PIDs. Processes may be created using the "fork" command which spawns a child process identical to a parent process. In so doing, an exchange of process identifiers is made, so that the parent process knows the identity of the child process.

In another example, processes may also be started by referring to file names instead of entry procedures. In such case, there may be some convention which identifies the first procedure from which to develop a list of procedure names which may be called. Again using the UNIX example, when a filename is used in a process start command, there is always a procedure called "main" in the file which is the default first procedure run. In this case, it is the procedure "main" in the file which takes on the role of the entry procedure.

Any statement which results in some process being started in some manner will be referred to generally as a process instigation statement.

A display may be created for a set of process references to be displayed consisting of a subset or all of the process references, the display consisting of a process display element representative of each process reference in said set of process references to be displayed, for example a bubble as depicted in FIG. 1D; and for each pair of process references in one of an inter-process indirect messaging relationship which are both included in the set of process references to be displayed, a connection display element representative of a connection between the display elements for the pair of process references. Each connection display element may for example be a line connecting the relevant process display elements labelled with the corresponding communications object identifier. It may be that multiple relationships between two processes exist in which case the line connecting the relevant display elements may be labelled with more than one communications object identifier.

The invention may be embodied in a processor readable medium containing a software program comprising instructions for a processor to implement any of the above described methods.

Furthermore, the invention may be embodied in a processing platform programmed for implementing any of the above described methods.

Numerous modifications and variations of the present invention are possible in light of the above teachings. It is therefore to be understood that within the scope of the appended claims, the invention may be practised otherwise than as specifically described herein.

The embodiments of the invention in which an exclusive property or privilege is claimed are defined as follows:

1. A method of identifying inter-process indirect messaging relationships in source code in which processes are identified by respective process references from an input consisting of an identification of a plurality of indirect messaging relationships which exist within the source code each consisting of a first procedure using a "send" type procedure and a second procedure using a "receive" type procedure, and a communications object identifier, the method comprising the steps of:

for each process reference appearing in the source code, identifying an associated set of procedures which may be used by a process having that process reference;

for each indirect messaging relationship:

a) identifying a first set of process references consisting of all process references which include the first procedure of the indirect messaging relationship in the respective process reference's associated set of procedures;

b) identifying a second set of process references consisting of all process references which include the second procedure of the indirect messaging relationship in the respective process reference's associated set of procedures; and c) extracting all possible pairs of process references including a first process reference from the first set of process references and a second process reference from the second set of process references;

wherein each pair of process references extracted identifies a potential inter-process indirect messaging relationship.

2. A method according to claim 1 further comprising the step of storing each pair of process references together with the corresponding communications object identifier extracted from the indirect messaging relationship which resulted in the extraction of the particular pair.

3. A method according to claim 1 further comprising the steps of:
creating a display for a set of process references to be displayed consisting of a subset or all of said process references, the display consisting of:
i) a process display element representative of each process reference in said set of process references to be displayed;
ii) for each pair of process references in one of said inter-process indirect messaging relationships which are both included in said set of process references to be displayed, a connection display element representative of a connection between the display elements for the pair of process references.

4. A method according to claim 3 wherein each connection display element is a line connecting the relevant process display elements labelled with the one or more corresponding communications object identifiers.

5. A method according to claim 1 wherein each process reference consists of a process name appearing in a process create statement which also contains a process identifier, and wherein a corresponding first procedure to be called for the process identifier appears in a process start statement which also contains an entry procedure, the method further comprising the steps of:
matching up pairs of process create statements and process start statements which contain the same process identifier, and associating the entry procedure in the process start statement with the process name in the process create statement;
identifying all procedures ultimately called by the entry procedure as said associated set of procedures for the corresponding process reference.

6. A method according to claim 1 wherein each process reference consists of a process identifier which appears in a process instigation statement including a file name, the method further comprising the steps of:
identifying a first procedure called within the file identified by the file name;
identifying all procedures ultimately called by the first procedure as said associated set of procedures for the corresponding process reference.

7. A method according to claim 6 wherein said step of identifying all procedures ultimately called by the first procedure comprises the step of performing a transitive closure on all procedures called by the first procedure.

8. A method according to claim 1 further comprising the step of examining said source code to produce said input comprising said plurality of indirect messaging relationships which exist within the source code.

9. A method according to claim 8 wherein said step of identifying a plurality of indirect messaging relationships comprises the steps of:
identifying all constructs within the source code which are interface procedure calls and storing each of these in a respective record in an indirect messaging table and including in each record a name of a procedure within which the interface procedure call was called, and including in each record a respective communications object identifier used in the respective interface procedure call;

identifying as indirect messaging relationships all pairs of records in the indirect messaging table consisting of a first record relating to a procedure calling the "send" type interface procedure call and a second record relating to a procedure calling a "receive" type interface procedure call with both the first and second records containing the same communications object identifier.

10. A method according to claim 9 wherein the step of identifying the constructs within the source code which are interface procedure calls comprises the steps of:
generating an object file(s) from the source code comprising all basic code objects and all basic relationship objects appearing in the source code;
identifying all basic relationship objects in the object file(s) which are interface procedure calls.

11. A method according to claim 10 wherein a record in the object file is only created for a given construct if the construct uses at least one global entity.

12. A method according to claim 11 wherein said step of identifying the constructs further comprises the steps of:
generating a DFA file(s) from the source code comprising basic code objects and basic relationship objects appearing in the source code which relate to constructs using at least one non-global entity;
identifying all basic relationship objects in the DFA file(s) which are interface procedure calls;
for each interface procedure call identified, determining if the interface procedure call uses a non-global entity in a predetermined position within the interface procedure call, and if so, identifying a global entity ultimately associated with the non-global entity and using this as the communications object identifier.

13. A method according to claim 12 wherein said step of identifying a global entity ultimately associated with the non-global entity is performed using data flow analysis.

14. A method according to claim 10 further comprising the step of determining if the construct uses a non-global entity in a predetermined position within the construct, and if so, identifying a global entity ultimately associated with the non-global entity and using this as the communications object identifier.

15. A method according to claim 14 wherein said step of identifying a global entity ultimately associated with the non-global entity is performed using data flow analysis.

16. A method according to claim 10 wherein said step of identifying all basic relationship objects in the object file which are interface procedure calls comprises the steps of:
identifying all basic relationship objects which are procedures calling procedures;
identifying the interface procedure calls from within the objects identified as being procedures calling procedures.

17. A method according to claim 10 wherein said step of identifying all basic relationship objects in the object file which are interface procedure calls comprises the steps of:
i) identifying all basic relationship objects which comprise a calling procedure calling a called procedure;
ii) determining a basic relationship object identified in step i) to be an interface procedure call if the called procedure is one of a predefined set of interface procedures.

18. A method according to claim 17 wherein each of said predefined set of interface procedures has associated with it a position identifier which identifies where a communications object identifier would appear in a call using the respective interface procedure and wherein the particular communications object identifier stored in the indirect messaging table for each interface procedure call is a symbolic name appearing in the position identified by the associated position identifier.

19. A method according to claim 10 wherein each basic relationship object is identified in the object file by at least one symbolic name, and by information locating the basic relationship object within the source code.

20. A method according to claim 19 wherein the information locating the basic relationship object within the source code comprises fields identifying a software entity within the source code containing the relationships and the line number of the basic relationship within that software entity.

21. A method according to claim 9 further comprising the step of storing in each record in the indirect messaging table fields identifying physical software entities which hierarchically contain the respective interface procedure call.

22. A method according to claim 21 further comprising the step of storing in each record in the indirect messaging table fields identifying logical containment of the respective interface procedure call.

23. A method according to claim 21 wherein said step of generating an object file comprises the step of categorizing basic relationship objects by type, one type being "procedure calling procedure".

24. A method according to claim 21 further comprising the step of creating an indirect messaging relationship record in an indirect messaging relationships table for each of said pairs.

25. A method according to claim 24 wherein each indirect messaging relationship record contains a pointer to each of said first and second records.

26. A method according to claim 9 further comprising the step of storing in each record in the indirect messaging table a field identifying a line number where the interface procedure call appeared.

27. A processor readable medium containing a software program comprising instructions for a processor to implement the method of claim 1.

28. A processing platform programmed for implementing the method of claim 1.

29. A system comprising:

source code storage for storing a collection of source code;

static structure identification means for identifying a static structured within the collection of source code;

indirect messaging relationships identification means for identifying indirect messaging relationships within the collection of source code, each indirect messaging relationship comprising a first procedure performing a "send" type procedure with respect to a respective particular communications object, a second procedure performing a "receive" type procedure with respect to the same particular communications object;

process identification means for identifying processes which would come into existence when the collection of source code is run, and for identifying all procedures which might be called in each process;

means for identifying inter-process indirect messaging relationships by identifying for each indirect messaging relationship all processes using the first procedure and all processes using the second procedure and forming all possible combinations of one of the processes using the first procedure with one of the processes using the second procedure.

* * * * *